United States Patent
Allen-Bradley et al.

(10) Patent No.: US 8,517,686 B2
(45) Date of Patent: Aug. 27, 2013

(54) FLOW PASSAGE FOR GAS TURBINE ENGINE

(75) Inventors: Eunice Allen-Bradley, East Hartford, CT (US); Thomas J. Praisner, Colchester, CT (US); Eric A. Grover, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 937 days.

(21) Appl. No.: 12/623,051

(22) Filed: Nov. 20, 2009

(65) Prior Publication Data

US 2011/0123322 A1    May 26, 2011

(51) Int. Cl.
*F01D 5/30*    (2006.01)
(52) U.S. Cl.
USPC ........................................... 416/193 A
(58) Field of Classification Search
USPC ............................................ 416/193 A, 914
See application file for complete search history.

(56) References Cited

U.S. PATENT DOCUMENTS

| | | | |
|---|---|---|---|
| 2,735,612 A | 2/1956 | Hausmann | |
| 2,918,254 A | 12/1959 | Hausmann | |
| 3,529,631 A | 9/1970 | Riollet | |
| 4,135,857 A | 1/1979 | Pannone et al. | |
| 4,208,167 A | 6/1980 | Yasugahiva et al. | |
| 4,420,288 A * | 12/1983 | Bischoff ................... | 416/244 A |
| 4,465,433 A | 8/1984 | Bischoff | |
| 6,283,713 B1 | 9/2001 | Harvey et al. | |
| 7,251,592 B1 | 7/2007 | Praisner et al. | |
| 2007/0258817 A1 | 11/2007 | Allen-Bradley et al. | |
| 2007/0258819 A1 | 11/2007 | Allen-Bradley et al. | |

* cited by examiner

*Primary Examiner* — Dwayne J White
(74) *Attorney, Agent, or Firm* — O'Shea Getz P.C.

(57) ABSTRACT

Inefficiencies associated with the formation of horseshoe vortices in a gas turbine engine having a row of radially extending airfoils, are mitigated with an improved flow passage defined by the suction and pressure surface of two adjacent airfoils and endwalls (disposed proximal to the radially inner and outer ends of the airfoils). The flow passage includes a ridge disposed in one of the endwalls adjacent a suction surface of one of the airfoils, the ridge extending longitudinally from a location at or near the maximum circumferential extent of the airfoil suction side to a downstream location proximal to the trailing edge of the suction surface.

17 Claims, 4 Drawing Sheets

FLOW PASSAGE FOR GAS TURBINE ENGINE

BACKGROUND OF THE INVENTION

1. Technical Field

This invention relates generally to gas turbine engines and particularly to a flow passage thereof having reduced secondary flow losses therethrough.

2. Background Information

A gas turbine engine includes a turbine module with one or more turbines for extracting energy from a stream of working medium fluid. Each turbine has a hub capable of rotation about a longitudinal axis of the engine. The hub typically includes peripheral slots for holding one or more rows of blades. Each blade usually includes an attachment adapted to fit in one of the slots, a radially inner platform and an airfoil. When the blades are installed in the hub, the platforms cooperate with each other to partially define a radially inner boundary of an annular working medium flow duct. The airfoils span across the flow duct so that the airfoil tips are in close proximity to a nonrotatable casing. The casing circumscribes the blade row to partially define the radially outer boundary of the annular flow duct. However, the blades may also have radially outer platforms or shrouds that partially define the radially outer boundary of the annular flow duct.

A typical turbine module also includes one or more arrays of vanes that are nonrotatable about the engine axis for directing working medium flow through the turbine. Each vane may have radially inner and outer platforms that partially define the radially inner and outer annular flow duct boundaries. A vane airfoil spans across the flow duct from the inner platform to the outer platform. Thus, it will be seen that the annular flow duct comprises a multiplicity of flow passages defined by pairs of adjacent blade or vane airfoils, platforms and shrouds (or the engine case if the blades are shroudless). The platforms and shrouds or the adjacent portion of the engine case if the blades are shroudless, are typically referred to as passage endwalls.

During engine operation, a stream of working medium fluid flows through the above-described annular flow duct. Near the endwalls of the flow passages between pairs of adjacent vanes or blades, the working medium fluid flow may exhibit a phenomenon known as horseshoe vortices. Horseshoe vortices form as a result of the endwall boundary layer of the working medium fluid separating from the endwalls as the fluid approaches the leading edges of the airfoils. The separated flow reorganizes into horseshoe vortices as a result of mixing with the main fluid flow through the flow passage. There is a high loss of efficiency associated with such horseshoe vortices. This loss is referred to as a "secondary" or "endwall" loss. As much as 30% of a loss in efficiency in a row of airfoils can be attributed to endwall losses. While various schemes have been proposed in the prior art to reduce the losses associated with horseshoe vortices, such schemes have shown to be somewhat less than optimal, particularly when applied to turbines having low aspect ratio airfoils which do not provide a high degree of turning of the fluid flowing past the airfoils. Such low turning, low aspect ratio airfoils are employed in mid-turbine frame engine architectures in which the bearings for the low pressure and high pressure turbine rotors are mounted on a common frame structure disposed longitudinally between the low pressure and high pressure turbines. Accordingly, improved turbine flow passages wherein the formation of horseshoe vortices and the losses associated therewith are reduced, are sought.

SUMMARY OF THE DISCLOSURE

In accordance with the present invention, a flow passage in a gas turbine engine comprising a pair of adjacent radially extending airfoils and two radially spaced endwalls disposed proximally to the radially inner and outer ends of the airfoil is provided with an elongated ridge adjacent the suction surface of one of the airfoils, which ridge projects from a radially inner one of the endwalls and which accelerates the working medium flow through the flow passage to inhibit the formation and endurance of horseshoe vortices. The ridge has an upstream end and a downstream end, the upstream end thereof being disposed generally at or near the maximum circumferential expanse of the airfoil within the flow passage. In the preferred embodiment, the upstream end of the ridge has an outer surface which is generally biased toward the suction surface. The downstream end of the ridge is longitudinally located proximally to the trailing edge of the suction surface, generally within the downstreammost 20% of the axial chord line of the suction surface. Except for the portion of the endwall from which the ridge extends, the endwall is essentially uninterrupted, i.e., includes no other ridges, depressions or other discontinuities, thereby minimizing the cost of manufacture associated with the present invention. The ridge may be contiguous with the suction surface and in the preferred embodiment includes a peak having a smooth convex, curvilinear surface.

The flow passage of the present invention effectively reduces the inefficiencies associated with the generation and movement of horseshoe vortices through an associated gas turbine engine and is well suited for use between guide vanes in the transition duct between low pressure and high pressure turbines. However, it will be understood that the invention hereof is equally applicable to flow passages defined between rotatable turbine blades or vanes at other locations within the engine.

DETAILED DESCRIPTION OF THE INVENTION

Figure 1:
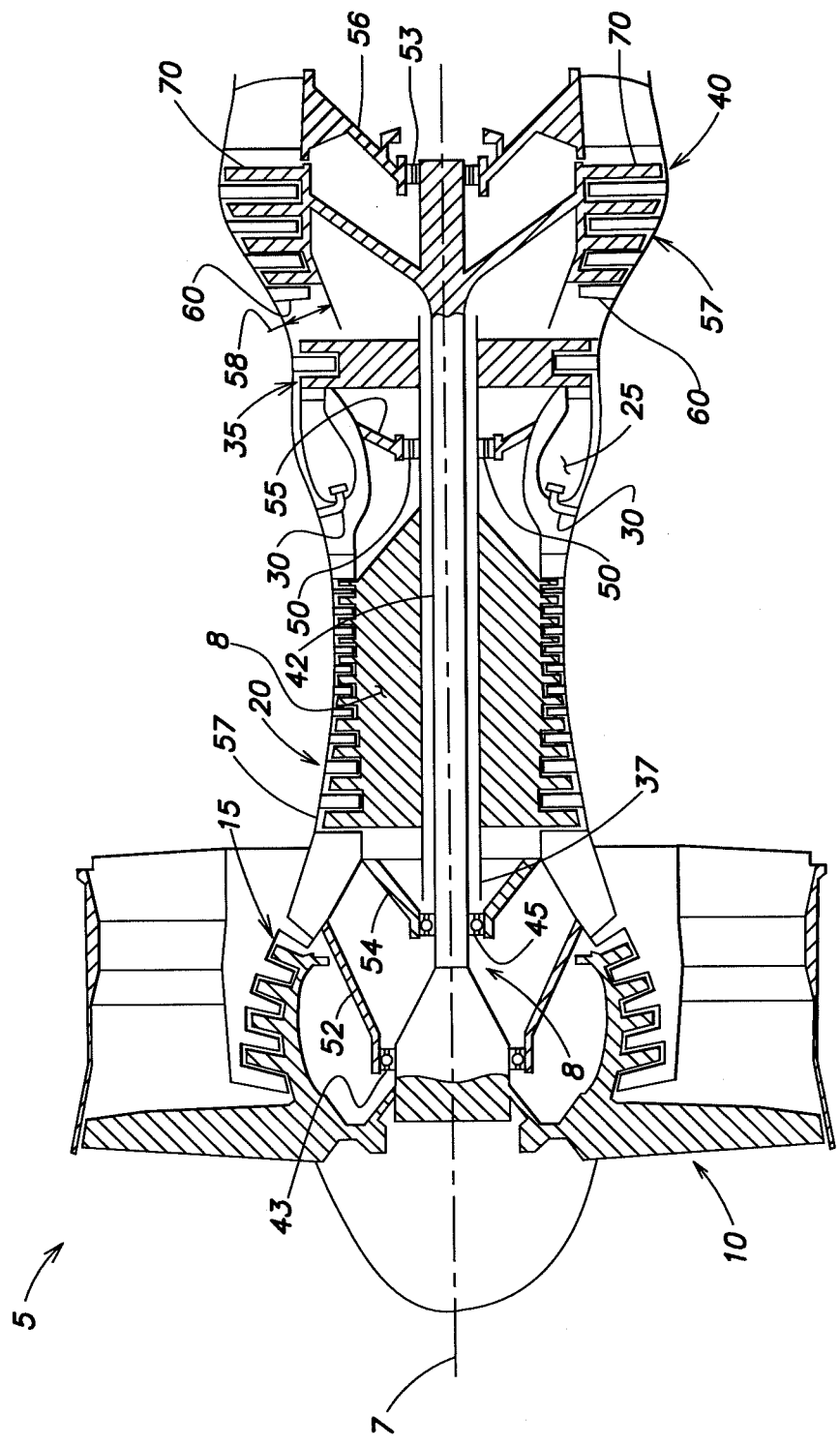
FIG. 1 is a schematic view of a turbo fan gas turbine engine.

Referring to FIG. 1, a turbo fan gas turbine engine 5 has a longitudinal axis 7 about which the rotors 8 of the engine rotate. A fan 10 disposed at the engine inlet draws air into the engine. A low pressure compressor 15 located immediately downstream of fan 10 compresses air exhausted from fan 10 and a high pressure compressor 20 located immediately downstream of low pressure compressor 15, further compresses air received therefrom and exhausts such air to combustors 25 disposed immediately downstream of high pressure compressor 20. Combustors 25 receive fuel through fuel lines 30 and ignite the fuel/air mixture. The burning fuel-air mixture (working medium fluid) flows axially to a high pressure turbine 35 which extracts energy from the working medium fluid and in so doing, rotates hollow shaft 37, thereby driving the rotor of high pressure compressor 20. The working fluid exiting the high pressure turbine 35 then enters low pressure turbine 40, which extracts further energy from the working fluid. The low pressure turbine rotor provides the power to drive the fan 10 and low pressure compressor 15 via low pressure shaft 42, which is disposed interiorly of the shaft 37. Working medium fluid exiting the low pressure turbine 40 provides axial thrust for powering an associated aircraft (not shown) or a free turbine (also not shown).

Figure 2:
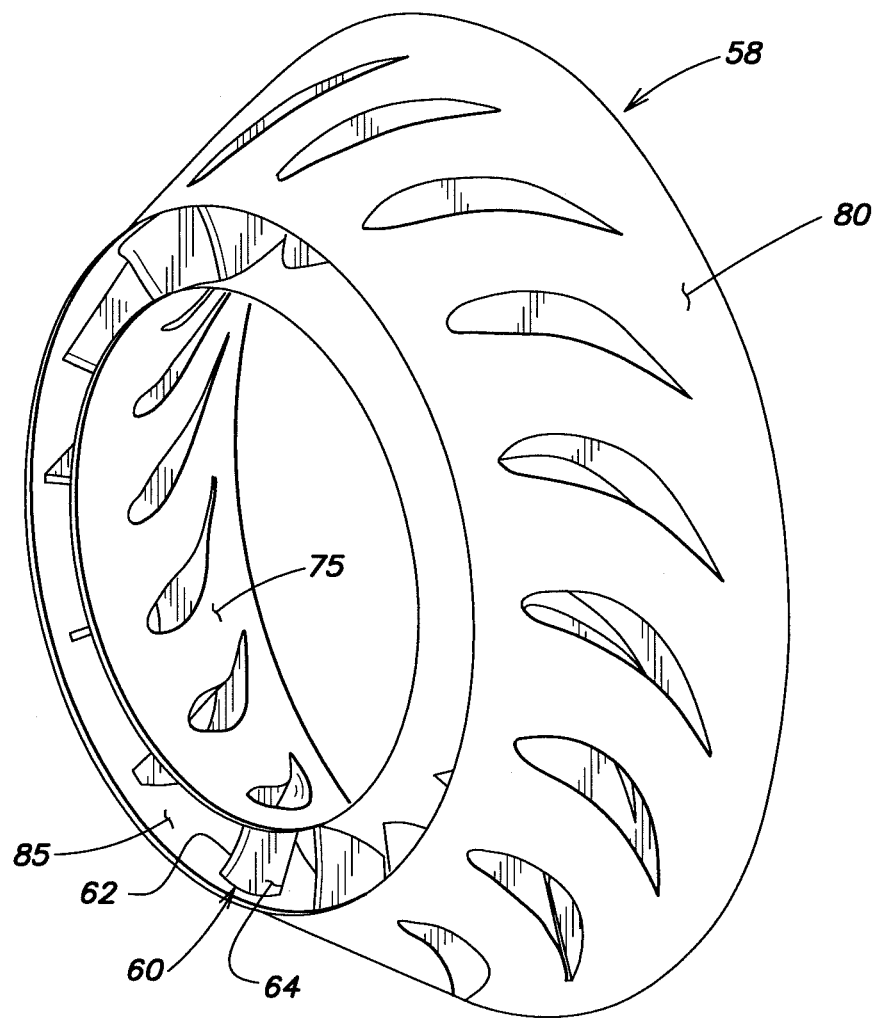
FIG. 2 is a perspective view of a transition duct through which working medium fluid flow exiting a low pressure turbine of the engine of FIG. 1 enters a high pressure turbine disposed immediately downstream therefrom.

Bearings 43, 45, 50 and 53 radially support the concentric high pressure and low pressure turbine shafts from separate frame structures 52, 54, 55 and 56 respectively, attached to engine case 57. However, it will be appreciated that the present invention is also well suited for mid-turbine frame engine architectures wherein the upstream bearings for the low and high pressure turbines are mounted on a common frame structure disposed longitudinally (axially) between the high and low pressure turbines. In fact, the present invention has been shown to be particularly well suited for use in a transition duct 58 through which working medium fluid exits the low pressure turbine 35 and flows to the high pressure turbine 40. As is well known in the art and as best seen in FIG. 2, transition duct 58 may be provided with a number of circumferentially spaced stationary guide vanes 60, each having a concave pressure side surface 62 and a convex suction side surface 64 (see FIG. 2) which direct the working fluid flow exiting high pressure turbine 35 to a direction for optimal energy capture by low pressure turbine 40 and low pressure turbine 40 are distributed around discs, whereby working fluid flows through the respective turbine via flow passages defined by the airfoils of adjacent blades and the inner platforms thereof and/or the periphery of the supporting disc and outer blade shrouds (if present) or a surrounding portion of the turbine case if the blades are shroudless. It is also well known to provide stationary vanes such as vanes 60 mentioned hereinabove with respect to the transition duct at various other axial locations in the engine to direct working medium fluid through the engine in directions for optimal energy capture therefrom. Thus, it will be understood that such vanes may be located wherever appropriate, such as at the exit of high pressure turbine 35. As set forth hereinabove, the spaced blades and vanes in the turbines define, with platforms and shrouds thereon or with portions of the turbine case surrounding such blades or vanes, a multiplicity of circumferentially spaced flow passages through which the working medium fluid flows as it passes through the turbines. Near the endwalls of such passages (e.g., the blade or vane platforms or shrouds or the adjacent portion of the engine case), the boundary layer of the working medium fluid tends to separate from the endwalls, mixes with the main flow of working medium fluid and reorganizes into horseshoe vortices which grow in scale as they extend along the passages between the airfoils. Such horseshoe vortices consume energy from the working medium fluid which would otherwise be available to perform useful work within the turbines. This consumption of working medium fluid energy by the horseshoe vortices results in significant inefficiencies in the turbines. In fact, energy losses from such horseshoe vortices or secondary losses as they are known can account for as much as 30% of the inefficiency in a single row of turbine blades.

Figure 3:
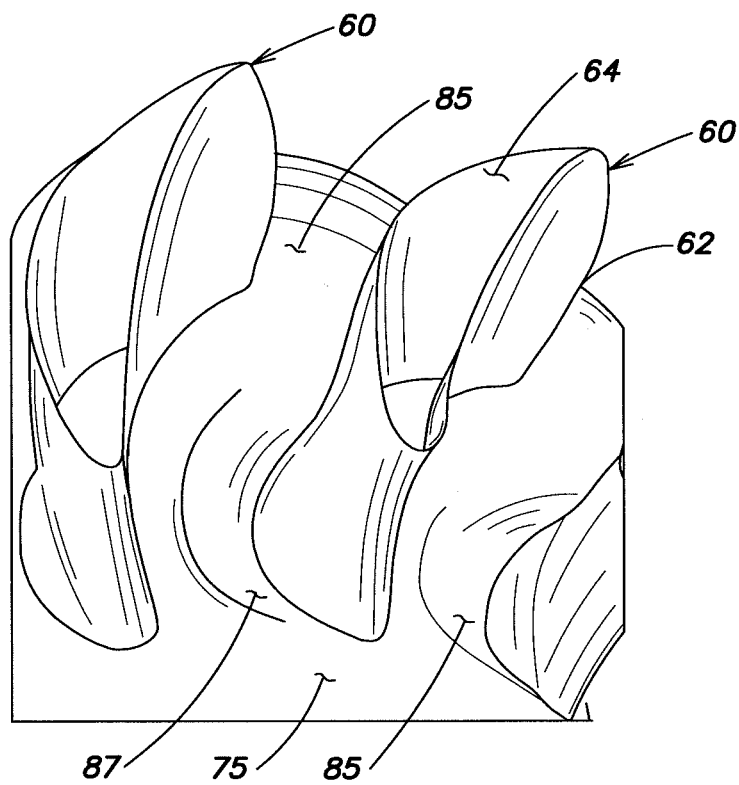
FIG. 3 is a perspective view of the flow passage of the present invention applied to an inner transition duct wall.
Figure 4:
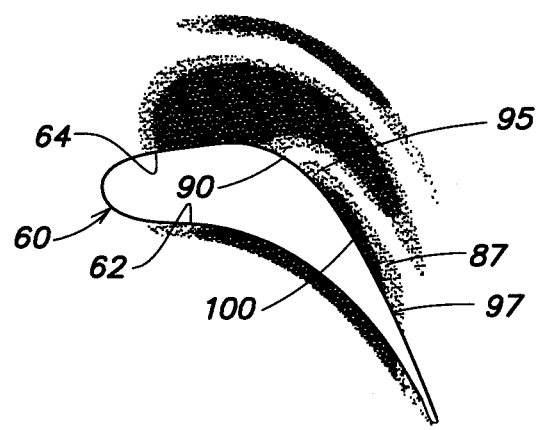
FIG. 4 is a plan view of the flow passage of the present invention shown in FIG. 3.

Using the present invention, these inefficiencies associated with the formation and movement of horseshoe vortices in flow passages between turbine airfoils are substantially mitigated. Referring to FIGS. 2-4, transition duct 58 comprises a pair of generally concentric truncated conical inner and outer duct walls 75 and 80, respectively, which retain vanes 60 therebetween, each such vane including a concave pressure surface 62 and a convex suction surface 64. As illustrated, vanes 60 are hollow to accommodate a flow of cooling air and/or structural members therethrough, although any appropriate vane structure may be used. Similarly, while vanes 60 are shown as being formed integrally with the transition duct walls 75 and 80, vanes 60 may comprise separate members attached to the duct walls by any suitable means as is known in the art.

Now referring to FIGS. 3 and 4, the transition duct walls 75 and 80 and vanes 60 define a multiplicity of generally circularly arranged flow passages 85, each such flow passage comprising the pressure surface 62 of one vane airfoil, the suction surface 64 of an adjacent vane airfoil and those portions (endwalls) of the inner and outer duct walls 75 and 80 between the vane airfoils. Inner endwall 75 is provided with an elongated ridge 87 (see FIG. 3) projecting radially outwardly from the endwall adjacent to the suction surface 64 of one of the airfoils. The ridge 87 has an upstream end 95 which abuts the suction surface 64 at or near its maximum circumferential expanse within the passage 85. The outer surface of the upstream ridge end 95 is generally biased toward (disposed more proximally to the suction surface than the remainder of the ridge). A downstream end 97 of the ridge 87 blends into endwall 75, from which the ridge 87 projects. As is readily seen, the ridge 87 is generally convex along substantially the entire length thereof, having a peak 100 defined by a smooth convex curvilinear surface. The ridge 87 is generally parallel to the suction surface 64 and may be contiguous therewith, ending at downstream end 97 generally within the downstreammost (20%) of the axial chord line of the suction surface 64. In the preferred embodiment wherein the flow passage of the present invention is disposed in a transition duct, between the low pressure turbine 35 and the high pressure turbine 40, the ridge is of a height generally between 1% and 20% of the span of the vane airfoils. Although the invention hereof is not so limited, the height of the ridge in relation to the span of the vane and airfoils is determined from analysis and testing of the overall flow characteristics of the working medium fluid flow and the operating parameters of the engine.

As illustrated, the ridge may be formed in the inner endwall of the flow passage of the present invention by deformation thereof or, as will be appreciated, the ridge may be formed by depositing material along the location of the ridge or attaching a ridge shaped member to the endwall by any suitable technique such as welding, brazing or the like. In any event, it will be appreciated that the ridge employed in the present invention is much more easily fabricated than many of the complex and elaborate prior art endwall contours such as depressions and the like which may add significantly to the manufacturing cost of the engine.

Testing and analysis of the flow passage of the present invention have shown that ridge 87 accelerates the flow of working medium fluid through flow passage 85 and in so doing, effectively breaks up horseshoe vortices which may form in the passage. While the flow passage of the present invention has been illustrated and described in the environment of flow passages between stationary vanes in a gas turbine engine transition duct, it will be appreciated that the present invention is equally well suited for flow passages defined by turbine airfoils, their platforms and shrouds, or, if no platforms or shrouds are used, by the edge of a rotatable disk on which the blades are mounted and the stationary turbine case which circumscribes the blades.

Accordingly, it will be understood that these and various other modifications and embodiments may be employed without departing from the true spirit and scope of the present invention as set forth in the claims appended hereto.

Having thus described the invention, what is claimed is:

1. A flow passage for a gas turbine engine having a longitudinal axis, said flow passage comprising a pressure surface and an opposed suction surface of two circumferentially spaced radially extending airfoils, and two radially spaced endwalls disposed proximally to the radially inner and outer ends of said airfoils, said flow passage further comprising an elongate ridge projecting radially from one of said endwalls adjacent said suction surface of one of said airfoils, said ridge including an upstream end disposed generally at the location of the maximum circumferential expanse of said suction surface and a downstream end disposed proximally to the trailing edge of said suction surface, the remainder of said endwall being generally uninterrupted.

2. The flow passage of claim 1, wherein said gas turbine engine includes high and low pressure turbines and said airfoils comprise two stator vanes located in a transition duct disposed longitudinally between said low and high pressure turbines, said endwalls comprising radially inner and outer flow surfaces of said transition duct.

3. The flow passage of claim 1, wherein said elongated ridge projects from a radially inner one of said endwalls.

4. The flow passage of claim 1, wherein said ridge has an upstream end and a downstream end, said upstream end of said ridge being generally biased toward said suction surface.

5. The flow passage of claim 1, wherein said downstream end of said ridge fairs into said endwall from which said ridge projects.

6. The flow passage of claim 1, wherein said ridge is convex along substantially the entire length thereof.

7. The flow passage of claim 6, wherein said ridge includes a peak having a smooth, convex, curvilinear surface.

8. The flow passage of claim 1, wherein said trailing end of said ridge is axially disposed generally within the downstreammost 20% of the axial chord line of said suction surface.

9. The flow passage of claim 1, wherein said ridge is of a height generally between 1% and 20% of the span of said airfoil having said suction surface.

10. The flow passage of claim 1, wherein said ridge is generally contiguous to said suction surface.

11. A gas turbine engine transition duct disposed between low and high pressure turbines thereof, said transition duct including coaxial radially inner and outer duct walls and a pair of circumferentially spaced radially extending airfoil shaped guide vanes disposed therebetween, said radially inner duct wall including an elongated ridge projecting radially inwardly from said inner duct wall, said ridge having an upstream end disposed generally at the location of the maximum circumferential extent of said suction surface and a downstream end disposed proximally to the trailing edge of said suction surface.

12. The gas turbine engine transition duct of claim 11, wherein said upstream end of said ridge is biased toward said suction surface.

13. The gas turbine engine transition duct of claim 11, wherein said downstream end of said ridge fairs into said inner transition duct wall.

14. The gas turbine engine transition duct of claim 11, wherein said ridge is convex along substantially the entire length thereof.

15. The gas turbine engine transition duct of claim 14, wherein said ridge includes a peak having a smooth, convex curvilinear surface.

16. The gas turbine engine transition duct of claim 1, wherein said downstream end of said ridge is axially disposed generally within the downstreammost 20% of the axial chord line of said suction surface.

17. The gas turbine engine transition duct of claim 11, wherein said ridge is of a height generally between 1% and 20% of the span of said vane having said suction surface.

* * * * *